United States Patent [19]
Green et al.

[11] 3,896,864
[45] July 29, 1975

[54] TIRE HAMMER

[76] Inventors: Frank D. Green; George Spector, both of 3615 Woolworth Bldg., 233 Broadway, New York, N.Y. 10007

[22] Filed: Jan. 15, 1974

[21] Appl. No.: 433,514

[52] U.S. Cl. ............................................. 145/36
[51] Int. Cl. ........................................ B25d 1/00
[58] Field of Search .... 145/29 R, 29 A, 29 B, 29 C, 145/29 D, 30 R, 30 A, 30.5, 36

[56] References Cited
UNITED STATES PATENTS

| | | | |
|---|---|---|---|
| 703,790 | 7/1902 | Humiston | 145/29 R |
| 1,089,234 | 3/1914 | Leslie | 145/29 R |
| 2,981,177 | 4/1961 | McRae | 145/29.4 X |
| 3,303,863 | 2/1967 | Titchnell | 145/29 R |
| 3,385,334 | 5/1968 | Clay | 145/36 |

*Primary Examiner*—Al Lawrence Smith
*Assistant Examiner*—Marc R. Davidson

[57] ABSTRACT

A hammering tool for use by a vehicle driver to pound against a tire so to shock the tire valve and make certain that it is not stuck so a tire pressure reading can be obtained, the tool consisting essentially of a hammer head on the end of a handle that can be held in the hand when pounding the tire.

2 Claims, 4 Drawing Figures

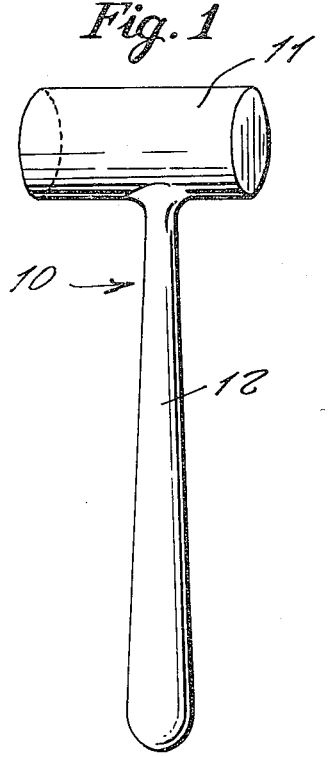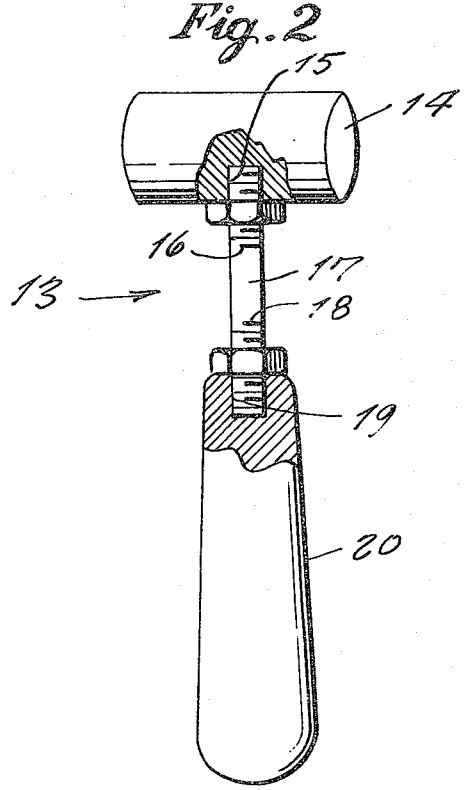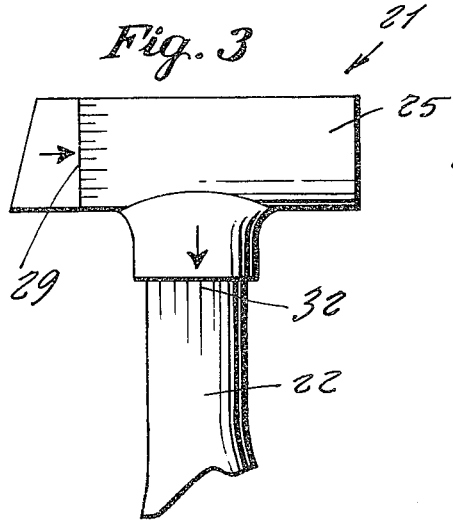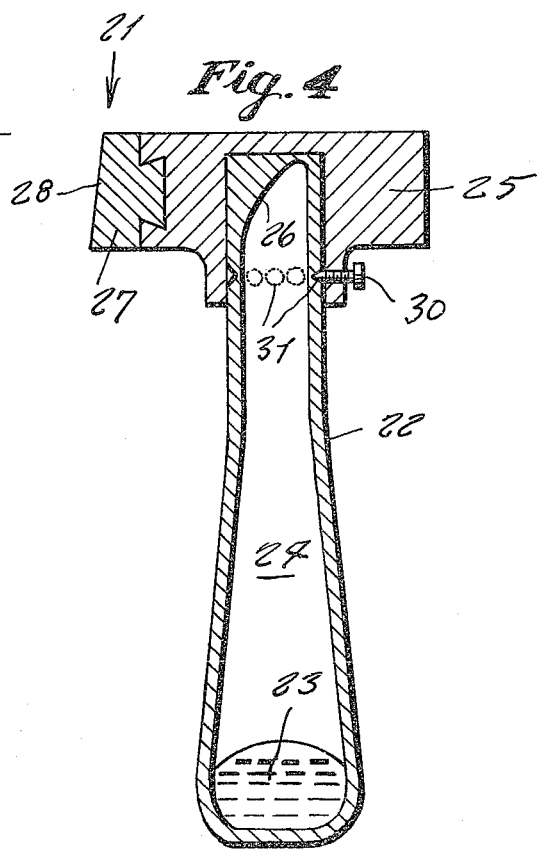

TIRE HAMMER

This invention relates generally to automotive accessories.

A principle object of the present invention is to provide a tire hammer for pounding a vehicle tire so to make sure the tire valve is free in order to take a pressure reading.

Another object is to provide a tire hammer that would be particularly desirable by truck drivers when wanting to check a pressure reading of a tire that is suspected of being too low; it being known that truck drivers often employ any available handy wrench or stone to hit the tire for the task.

Yet another object is to provide a tire hammer that can be attractively designed in appearance so as to appeal to truck drivers such as the shape of a nude woman, a bull dog or the like so that such design will always suggest the present tool to a person.

Yet another object is to provide a tire hammer that can be attractively named so as to appeal to drivers, such names as Tire Bumper, Rubber Bumper, Tire Hammer or Rag Flogger which is truck driver's slang.

Other objects are to provide a tire hammer which is simple in design, inexpensive to manufacture, rugged in construction, easy to use and efficient in operation.

These and other objects will be readily evident upon a study of the following specification and the accompanying drawing wherein:

FIG. 1 is a perspective view of the invention.

FIG. 2 is a similar view of a modified design in which the hammer head, stem and handle are able to be unscrewed apart for storage in small space.

FIGS. 3 and 4 are views of a further modified design in which the handle is hollow and has a quantity of mercury inside which during a blow of the hammer moves by centrifugal force to hit the sloping surface in the head so to impact additional striking force, forwardly as well as outwardly so to give a slightly sideward shock as well as to the struck surface of the tire so to better shock the guage, the hammer head striking face being inclined, the face being adjustable in direction, and the hammer head being adjustable respective to the inclined slope inside that is struck by the mercury.

Reference is now made to the drawing in detail, and more particularly to FIG. 1 thereof at this time, wherein there is shown a tee-shaped tire hammer 10 according to the present invention wherein there is a hammerhead 11 at one end of a handle 12, and which may be made either of separate parts secured together or else made integrally as one part.

In use, the driver holds the device by the handle and pounds the hammerhead against the truck tire.

In FIG. 2 a modified design of the invention is shown to comprise a tire hammer 13 that can be readily disassembled so that it can be conveniently stored in a minimum space. The tire hammer 13 comprises a hammerhead 14 having a threaded opening 15 in its side so as to threadingly receive a threaded end 16 of a straight or S-shaped bar 17 which has a threaded opposite end 18 engagable in a threaded opening 19 in the end of a handle 20. A lock nut on each threaded end 16 and 18 secures the hammerhead and handle rigidly to the bar 17.

In FIGS. 3 and 4, another modified design of tire hammer 21 includes a design of tire hammer 22 containing a small quantity of liquid mercury 23 which during a hammer blow moves, due to centrifugal force, toward the end of the cavity 24 which is closest to the hammerhead 25 when the mercury strikes with force against the angularly sloping surface 26 so as to give an additional striking force or impact in a direction which due to the angular surface is both forwardly as well as outwardly. Thus having a slightly sideward shock to the tire surface upon impact so to better shock the tire valve and guage.

Additionally the striking end of the hammerhead comprises a separate member 27 that is rotatable so that the inclined end face 28 thereof can be adjustably positioned in any direction respective to the inclined sloped surface 26 of the cavity.

Thus complete adjustability of the blow force is possible. A calibrated scale 29 serves for adjusting the member 27. The hammerhead is rotatable on the handle and is selectively securable in position by a set screw 30 engagable in selective notches 31 around the handle. A calibrated scale 32 serves for indicating respective position of the hammerhead on the handle.

While various changes may be made in the detail construction, it is understood that such changes will be within the spirit and scope of the present invention as is defined by the appended claims.

What is claimed is:

1. A tire hammer, comprising a handle and a head mounted removably on one end of said handle, wherein the long axis of said head is at right angles to the longitudinal axis of the handle, said head comprising a contact member rotatably mounted about the long axis of the head, said member having an external face inclined relative to the handle axis whereby rotation of said member will vary the orientation of the inclination relative to the handle axis, wherein the member has a wedge shaped projection fitted in a receiving bore in the head and wherein the handle is hollow with means for increasing the impact shock at the face upon delivering a blow, said means including an inclined interior surface and a freely moving weight in said handle which impinges on the interior surface upon impact.

2. A hammer as in claim 1 wherein the head has a bore aligned with the handle, said handle is removable and rotatably mounted in said bore, including means for retaining the head at various positions on the handle, including means for calibrating the orientation of inclination of said face relative to said handle.

* * * * *